Nov. 8, 1927.
W. E. SAVAGE
1,648,785
CONTAINER
Filed Feb. 8, 1924
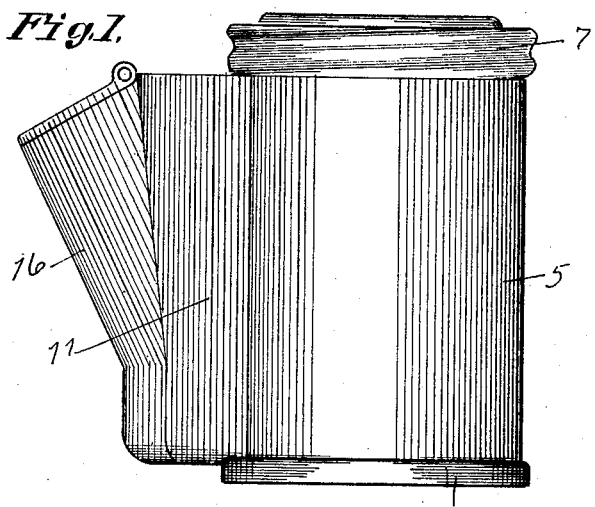
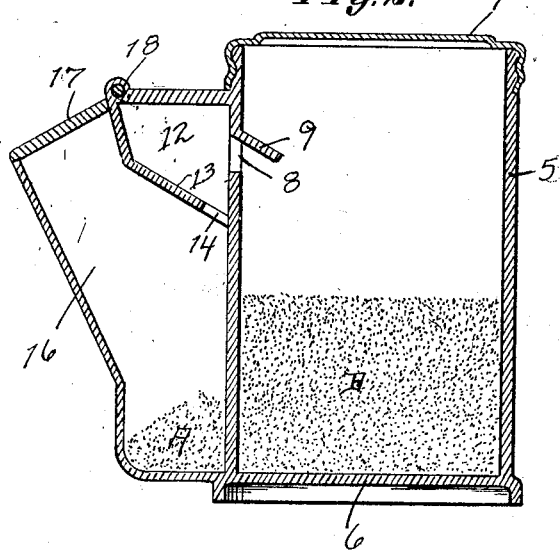
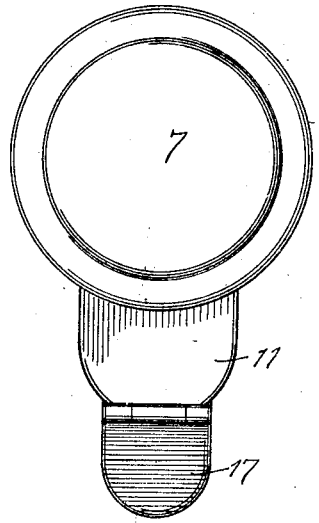
INVENTOR.
W. E. SAVAGE
BY Victor J. Evans
ATTORNEY.

Patented Nov. 8, 1927.

1,648,785

UNITED STATES PATENT OFFICE.

WALTER E. SAVAGE, OF MODESTO, CALIFORNIA.

CONTAINER.

Application filed February 8, 1924. Serial No. 691,446.

This invention relates to improvements in containers and has particular reference to a container primarily used for dispensing sugar.

The principal object of this invention is to provide a container which will dispense a predetermined amount of the commodity contained therein, one which will prevent foreign substances from entering the container and a container which will further prevent flies and the like insects from reaching the contents thereof.

A still further object is to provide a device of this character which is neat in appearance, simple in construction, economical to manufacture and positive in operation.

Other objects and advantages will be apparent during the course of the following description.

In the accompanying drawings forming a part of this specification and in which like numerals are employed to designate like parts throughout the same, Figure 1 is a side elevation of my container, Figure 2 is a longitudinal vertical section through the container, and Figure 3 is a top plan view of the same.

Many forms of containers have been devised and applicant is aware of many on the market which dispense commodities such as sugar, but due to their construction these containers are easily clogged and therefore inoperative.

Applicant has sought to provide a container which will obviate this difficulty and by referring to the drawings it will be noted that the numeral 5 designates a receptacle having a bottom 6 and a removable top 7. This top is preferably screw threaded upon the container so as to exclude moisture from entering the container, and to further permit a ready re-filling of the container.

The numeral 8 designates a port formed in one side of the container adjacent which is positioned a baffle 9, adapted to project into the container. This baffle is preferably secured or positioned adjacent the upper portion of the port 8. Secured to the outside of the container is an offset portion 11 within which is formed a chamber 12 having a slanting bottom wall 13.

It will be noted that a port 14 is formed in this bottom wall and is adapted to discharge the contents of the chamber into the lower portion of the offset portion.

A spout 16 is preferably formed integral with the offset portion and communicates therewith, which spout has its open end closed by a swinging lid 17 hinged as at 18.

From this construction it will be evident that when the receptacle is filled with a commodity, such as sugar, and tipped the first time, the sugar will pass out through the port 8 into the chamber 12, which will then become filled. When the receptacle as a whole is righted the sugar which is trapped in the receptacle 12 will pass out through the port 14 and assume the position shown at A in Figure 2, while the remaining sugar in the receptacle will assume the position shown at B. This first tipping might be termed a priming action.

A second tipping of the container will cause the sugar A to pass through the spout 16 and accordingly be dispensed, while the sugar B will again fill the chamber 12 and upon again righting the container, the sugar in the chamber 12 will be dispensed, as before described.

It is to be understood that the form of my invention herewith shown and described is to be taken as a preferred example of the same and that various changes in the shape, size and arrangement of parts may be resorted to without departing from the spirit of the invention or the scope of the subjoined claim.

Having thus described my invention, I claim:—

In a device of the character described, a commodity holding receptacle having an integral bottom and a removable top threadedly secured on said receptacle, a port formed in said receptacle at a point approaching its upper extremity, a baffle formed within said receptacle and positioned adjacent said port, said baffle being adapted to direct a portion of the contents of said receptacle through said port, an offset portion secured to the outside of the said container, a chamber formed in said offset portion, said chamber communicating with the interior of said receptacle through said port, a second port formed in the bottom of said chamber, the lower portion of said offset being of a greater area than the area of said chamber and a spout formed integral with the offset portion, said spout being provided with a hinged lid thereon and adapted to normally close said spout when said receptacle is in an upright position.

In testimony whereof I affix my signature.

WALTER E. SAVAGE.